(12) United States Patent
Schill et al.

(10) Patent No.: US 7,310,496 B2
(45) Date of Patent: Dec. 18, 2007

(54) BROADCAST RECEIVER

(75) Inventors: Dietmar Schill, Winnenden (DE);
Carsten Merkle, Welzheim (DE);
Markus Zumkeller, Schwaikheim (DE)

(73) Assignee: Sony Deutschland GmbH, Cologne (DE)

( * ) Notice: Subject to any disclaimer, the term of this patent is extended or adjusted under 35 U.S.C. 154(b) by 564 days.

(21) Appl. No.: 09/931,367

(22) Filed: Aug. 16, 2001

(65) Prior Publication Data

US 2002/0022462 A1 Feb. 21, 2002

(30) Foreign Application Priority Data

Aug. 18, 2000 (EP) .................................. 00117815

(51) Int. Cl.
*H04Q 7/22* (2006.01)
*H04Q 7/20* (2006.01)
*H04H 1/00* (2006.01)

(52) U.S. Cl. ................. 455/3.04; 455/179.1; 455/455; 455/414.3; 455/3.01

(58) Field of Classification Search ............... 345/765; 455/3.01–3.02, 3.03, 179.1, 455, 414.3, 3.04, 455/3.06, 3.1; 709/203, 231; 725/32, 34, 725/35, 36, 39; *H04H 01/00*
See application file for complete search history.

(56) References Cited

U.S. PATENT DOCUMENTS

| | | | |
|---|---|---|---|
| 5,418,782 A | | 5/1995 | Wasilewski |
| 5,579,537 A | * | 11/1996 | Takahisa ..................... 455/3.06 |
| 5,941,933 A | * | 8/1999 | Miyake et al. ............... 701/208 |
| 6,161,127 A | * | 12/2000 | Cezar et al. ................. 709/203 |
| 6,167,255 A | * | 12/2000 | Kennedy et al. .......... 455/414.1 |
| 6,526,575 B1 | * | 2/2003 | McCoy et al. ................ 725/36 |
| 6,587,127 B1 | * | 7/2003 | Leeke et al. ................. 345/765 |
| 6,587,835 B1 | * | 7/2003 | Treyz et al. ................... 705/14 |
| 6,665,533 B1 | * | 12/2003 | Sakoda ..................... 455/414.2 |
| 6,721,536 B1 | * | 4/2004 | Shimazu ..................... 455/3.02 |
| 6,876,835 B1 | * | 4/2005 | Marko et al. ............... 455/3.06 |
| 7,161,637 B2 | * | 1/2007 | Strickland et al. .......... 348/731 |
| 2001/0053944 A1 | * | 12/2001 | Marks et al. ................. 700/94 |
| 2002/0016963 A1 | * | 2/2002 | Inoue et al. ................... 725/39 |

(Continued)

FOREIGN PATENT DOCUMENTS

EP    0 926 895    6/1999

(Continued)

*Primary Examiner*—Fan Tsang
*Assistant Examiner*—Lisa Hashem
(74) *Attorney, Agent, or Firm*—Oblon, Spivak, McClelland, Maier & Neustadt. P.C.

(57) ABSTRACT

In digital broadcast systems, it is common to broadcast besides main services additional services like news services. Typically, these additional services are regularly updated and broadcasted by a service provider (3) several times a day. In order to keep service data transmitted by the additional services up to date in a receiving device (1) receiving the services, a method of accessing services is given according to which a respective service information about the services provided by service providers (3) is extracted from a service presently received by the receiving device (1), and then at least one of the services about which service information was extracted according to the respective extracted service information might be accessed. Thus, the service data can automatically be updated by the receiving device (1) itself, even if transmission conditions of an additional service like update rates change over the time.

38 Claims, 4 Drawing Sheets

U.S. PATENT DOCUMENTS

2004/0043770 A1 * 3/2004 Amit et al. ................ 455/450

FOREIGN PATENT DOCUMENTS

| EP | 0 975 109 | 1/2000 |
| EP | 0975109 * | 1/2000 |
| EP | 975109 A1 * | 1/2000 |
| JP | 11 112946 | 4/1999 |
| WO | WO 97 39540 | 10/1997 |

* cited by examiner

BROADCAST RECEIVER

The present invention relates to a method for accessing additional services broadcasted besides a main service, and an apparatus and a signal used therefore, as described in the respective preambles of claims 1, 15 and 20.

In digital broadcast systems, it is common to broadcast besides main services like music services additional services, for example news services, weather services, or stock exchange services. Such additional services may typically be low bit rate services, which are transmitted and updated several times a day. Using a receiving device, it is therefore possible to access such additional services besides the main services at the same time. Accordingly, a user can be informed about the weather while at the same time listening to music, for example. Alternatively or additionally, such additional services might also interrupt the main service.

For a user it would be very convenient, if this kind of additional services would be up to date and available every time the receiving device is switched on. To achieve this, it would be possible to permanently transmit those additional services. However, as the broadcast data of an additional service is usually a part of the broadcast data of a corresponding main service and thus is transmitted at the same time as the main service broadcast data, a permanent broadcasting of the additional services would result in a lowered data capacity of the main service. This, however, would mean a lowered quality of the main service.

To solve this problem, U.S. Pat. No. 5,101,510 proposes a radio traffic report receiver which is capable of providing up to date traffic announcements which are transmitted in time intervals which are dimensioned approximately such that they correspond to an average broadcast cycle for traffic announcements. To do this, the radio traffic report receiver continuously monitores an updating bit of the traffic announcments, i.e. continuously activates at least the parts of the receiver needed for receiving the traffic announcements. In a preferred embodiment a scheduler activates said parts of the receiver needed for receiving the traffic announcements in approximated time intervals to monitor the updating bit. After having received the traffic announcements, the scheduler causes the radio traffic report receiver to enter its sleeping state again. Thus, announcments are up to date even if the receiver had been switched off.

However, if transmission conditions of the additional services like updating rates change over the time, it is no longer possible to use a receiving device as described above, because this receiving device works best for fixed retransmission cycles. Thus, it would be necessary to reprogram the update rates in the receiving device by a radio manufacturer, which is very inconvenient and costly.

Therefore, it is an object of the present invention to provide an improved method for accessing services provided by at least one service provider by using a receiving device, which ensures that the accessing process is possible even if transmission conditions of the respective services are changing over time.

To solve this object, the present invention provides a method of accessing at least one additional service temporarily included within a respective main service provided by a respective service provider, said accessing process using a receiving device connectable to said respective service provider, which is characterized by the steps of extracting from a main service presently received by said receiving device service information about al. least one of said corresponding additional services, and accessing at least one of said additional services about which service information was extracted according to said respective extracted service information.

Further, the present invention provides a broadcast signal being sent from a service provider to a receiving device for providing said receiving device with a main service, which is characterized by containing service information about at least one additional service provided by said service provider indicating how to access said at least one additional service.

In addition, the present invention provides an apparatus for accessing at least one additional service provided by at least one service provider, said apparatus comprising receiving means connectable via at least one service channel to said at least one service provider for receiving at least one additional service from said at least one service provider, a user interface for informing a user and for controlling said apparatus by said user, and a processing unit connected to said receiving means and to said user interface, said apparatus being characterized by a scheduler means connected to said processing unit for controlling said process of accessing said at least one additional service, a service information memory means for storing service information needed by said scheduler means to control said apparatus, and a service data memory means connected to said processing unit for storing service data extracted by said receiving means from said at least one additional service according to said service information.

Further preferred embodiments of this methods, the broadcast signal and the apparatus according to the present invention defined in independent claims 1, 15, and 20, respectively, are described in the respective subclaims.

An important aspect of the invention is that all service information needed by the receiving device to access an additional service is included and transmitted within a main service currently received by said receiving device. For example, within a music service as a main service presently received, the service information about several additional information services, like news services is included. The receiving device may access the news services according to the service information included in the music service. In other words, each time of accessing a main service or each time the service information included in a currently received main service changes may have an influence upon the further "behaviour" of the receiving device, as these events may provide new service information to the receiving device, respectively.

The information included in a main service may also comprise service information about main services itself. For example, the service information of a first music service may include the starting time and the service channel of a concert transmitted in the future by a second music main service, which is then accessed according to said service information. As another example, the service provider may cause the receiving device to switch to another main service transmitting important news which should be known by the user. In other words, the service information included in a main service is not restricted to additional services, i.e. the term main service is not necessarily related to the content of the service, like an audio service, but necessarily provides scheduling information for one or more additional services.

The service information included in a main service currently received may not comprise only information about additional services provided by the same service provider, but may also include service information about services provided by other service providers. For example, service information included within a main service of service provider A may contain information about main or additional services only provided by service provider B.

In a first step, the receiving device extracts the service information from a main service which is presently received by the receiving device. This step can be executed on demand, in regular time intervals or permanently. In a second step, which is optional, the extracted service information is stored in the receiving device or is monitored to inform the user. Then, in a third step, the receiving device processes the extracted service information and accesses additional services according to said extracted information. The receiving device may, for example, successively access all additional services for which service information has been found within the main services currently received, respectively, or may just pick out some of them.

The execution of the second step, i.e. the storing of the extracted service information and its content, has the advantage that necessary service information about accessing additional or main services is immediately available after switching on the receiving device. The receiving device does neither have to "wait" until the service information is sent nor to extract the service information again from a main service.

The third step may be executed while leaving the first two steps, i.e. the accessing process may be executed only on the basis of the stored service information, if all necessary information to access a service is already available in terms of stored service information. The stored service information may contain instructions to access a news service every hour, for example. The corresponding accessing process is then performed exclusively on the basis of that stored service information. Only when the transmission conditions of the news service change, the stored service information is updated accordingly by extracting new service information from a main service currently transmitted by the corresponding service provider, and the next accessing processes of the news service will be executed on the basis of the updated, stored service information.

The advantage of the above described mechanism is that the user does not need to know any details about transmission conditions or accessing data from the respective services, as this information is transmitted and processed automatically by the receiving device. The receiving device figures out itself whether, for example, the update rates of an additional service have changed, as this is indicated by new service information included in the main service presently received, which is accessed by the receiving device. As a result, the change of the service information influences the accessing behaviour of the receiving device. In other words, the receiving device automatically adjusts itself to changing transmission conditions. The service information can be updated by extracting new service information containing the updated transmission conditions from the main service presently received.

If the services to be accessed, like in the example given above, are transmitted only at serveral times, the corresponding service information may contain time information indicating transmission times of the respective services to the receiving device. The time information may include the next absolute transmission time of a news service, for example. In case of several service channels in-between the receiving device and the service provider the service information preferably includes service channel information about several services showing which service channel will be used when transmitting a corresponding service from a service provider via the service channel to the receiving device, respectively. The service information may also include a service ID and a service name to enable the receiving device to distinguish between the different services, respectively.

While accessing an additional service, the receiving device preferably extracts service data therefrom, respectively, and stores the extracted service data in the receiving device, or monitors it. For example, news data may be extracted from a news service, which is immediately monitored and/or stored in the receiving device.

The user may control the accessing process of services by subscribing into a service list containing entries representing available services of service providers. For example, when switching on the receiving device, the receiving device extracts service information from a main service currently received and shows all available additional services contained within the service information to the user in form of the service list. Further, the receiver may also scan all or a part of all receivable main services to respectively extract service information therefrom and including it into the service list. The user then subscribes to wanted additional services which should be accessed by the receiving device. The receiving device then only accesses those additional services subscribed by the user. The process of subscribing may update the stored service information, as subscribed additional services are memorized in terms of stored service information.

This principle can be applied to the case when the receiving device is in a deactivated status, i.e. the receiving device is switched off by the user. In such a case, a built-in scheduler means (in the following referred to as scheduler) of the receiving device takes control over the receiving device. The scheduler activates the receiving device every time when a additional service which is temporarily transmitted and subscribed by the user is transmitted to the receiving device. The respective additional service is accessed and the service data contained therein is stored within the receiving device. At this time, the receiving device may also extract service information from a main service currently received in order to check if the service information contained therein has changed. If it has changed,. then an update process is executed, which means that the changed service information is extracted and stored in the receiving device. Then, the scheduler causes the receiving device to enter again into its previous, for example deactivated status. At the transmission time of the next additional service subscribed by the user the scheduler again activates the receiving device or necessary parts thereof for accessing this additional service. The process of accessing is executed on the basis of the service information stored within the receiving device which might be updated during the previous accessing process, as described above.

This means that each wake-up cycle of the receiving device may have an influence upon an accessing process of the next wake-up cycle.

The advantage thereof is that even in the switched-off state the receiving device is able to update service data transmitted by the respective additional service which will result in that the user has always updated service data and service information when switching on the receiving device. Thus, the always updated service data stored in the receiving device can immediately be monitored and thereby checked by the user. It is also possible that the receiving device switsches on from time to time just to update the service data.

Problems might occur, if two additional services subscribed by the user are transmitted at the same time to the receiving device. In this case, it is not possible to access both additional services, if the receiving device can only receive one additional service at the same time. To solve these problems, the scheduler manages the time order of different accessing processes assigned to different additional services transmitted at the same time. This managing process is preferably done according to the stored service information. This means that the user can set the priority levels. For example, the additional service subscribed last by the user is provided with the highest priority. The managing process can also be done on the basis of the service information extracted from a main service at the moment. This would mean that the service provider can set the priority levels. Therefore, the service information may include priority information indicating which of several additional services has the highest priority in the case that these additional services are transmitted at the same time.

If the receiving device is in its activated state, it preferably accesses only that additional services which are transmitted over the same service channels used by currently received main services, which ensures that no interruption of the main service presently received occurs. For example, a music service will not be interrupted while accessing a news service when the news service uses the same service channel as the music service.

The possibility of activating and deactivating the receiving device offers the advantage that a lot of energy can be saved in contrast to always keep the receiving device in its activated state, which would be generally necessary to keep the stored service data up to date. In order to save even more energy, the scheduler may eliminate subscribed services in the service list, if the power resources of the receiving device fall below a predetermined limit. As a consequence, the receiving device would be activated less frequently which leads, as described above, to an additional saving of energy.

From a different point of view, the invention described above provides a method for a service provider to adjust receiving devices receiving services from the service provider to transmission conditions changing over the time.

To realize this, the present invention provides a special broadcast signal to transfer services from a service provider to the receiving device. This broadcast signal contains additional information in addition to the main service. Preferably, service information about several additional services for instructing the receiving device how to access these additional services provided in the future is included within the broadcast signal.

For example, the additional information comprises time information being structured such in that it comprises an information to enable the receiving device the access of a subscribed service, e.g. at least one absolute time of a next transmission of a corresponding additional service, or at least one relative time to a full hour, if said corresponding additional service is transmitted every hour, or the time of the beginning of the day plus at least one repetition rate of the corresponding additional service. Moreover, the additional information may contain priority information about different services being transmitted at the same time to the receiving device.

Further advantages and embodiments of the present invention will be explained below in conjunction with the following drawing.

Figure 1:
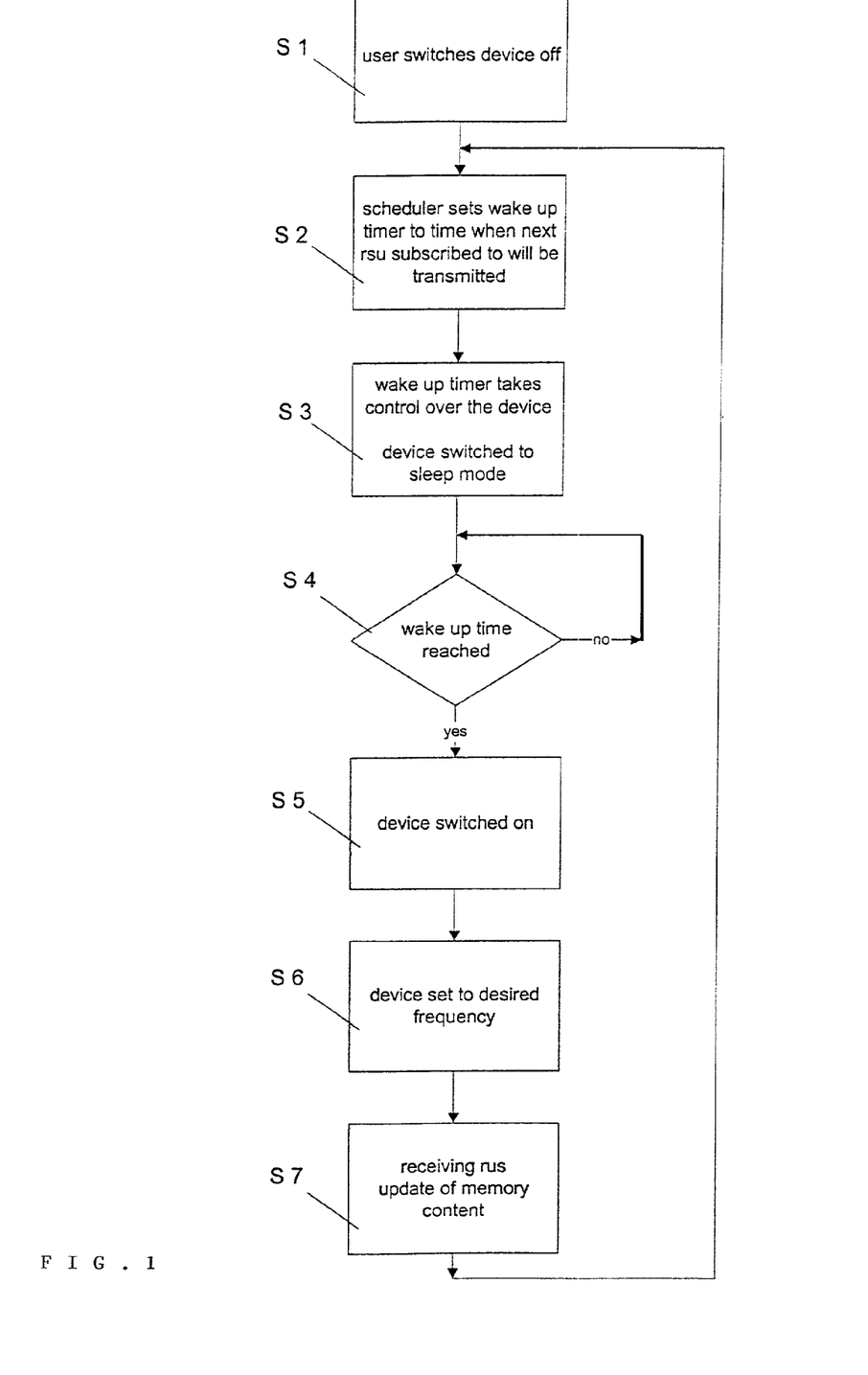
FIG. 1 shows a flow chart describing a preferred embodiment of the process of activating and deactivating a receiving device including an accessing process of an additional service and an corresponding updating cycle of service information and service data in the receiving device according to the present invention.

In the following description, referring to FIG. 1, a preferred embodiment of a method for updating service information and service data stored within a receiving device is given for the case that the receiving device is deactivated by the user.

In the first step S1, the user switches the receiving device off. This causes a built-in scheduler of the receiving device to take control over the device. The scheduler sets a wake-up timer to the time when the next additional service subscribed by the user will be transmitted to the receiving device, this step S2 is performed on the basis of stored service information. In the next step S3, the wake-up timer switches the receiving device to the deactivated state. In the next step S4, the wake-up timer regularly monitors/checks/determines if a wake-up time corresponding to the transmission of the next additional service has been reached. If this is the case, then in a next step S5 the receiving device is switched on. In step S6, the receiving device is connected to a service channel corresponding to the additional service to be received. In a further step S7, the additional service is accessed, and an updating process is executed, which means that service information as well as service data is extracted from the additional service, which is stored in the receiving device. Then, the process returns to step S2 again. Steps S2 to S7 are repeated until the user switches the device on again.

Preferably, but not necessarily in step S6 additional information concerning priorities of different additional services transmitted at the same time to the receiving device is taken into account as described above.

Figure 2:
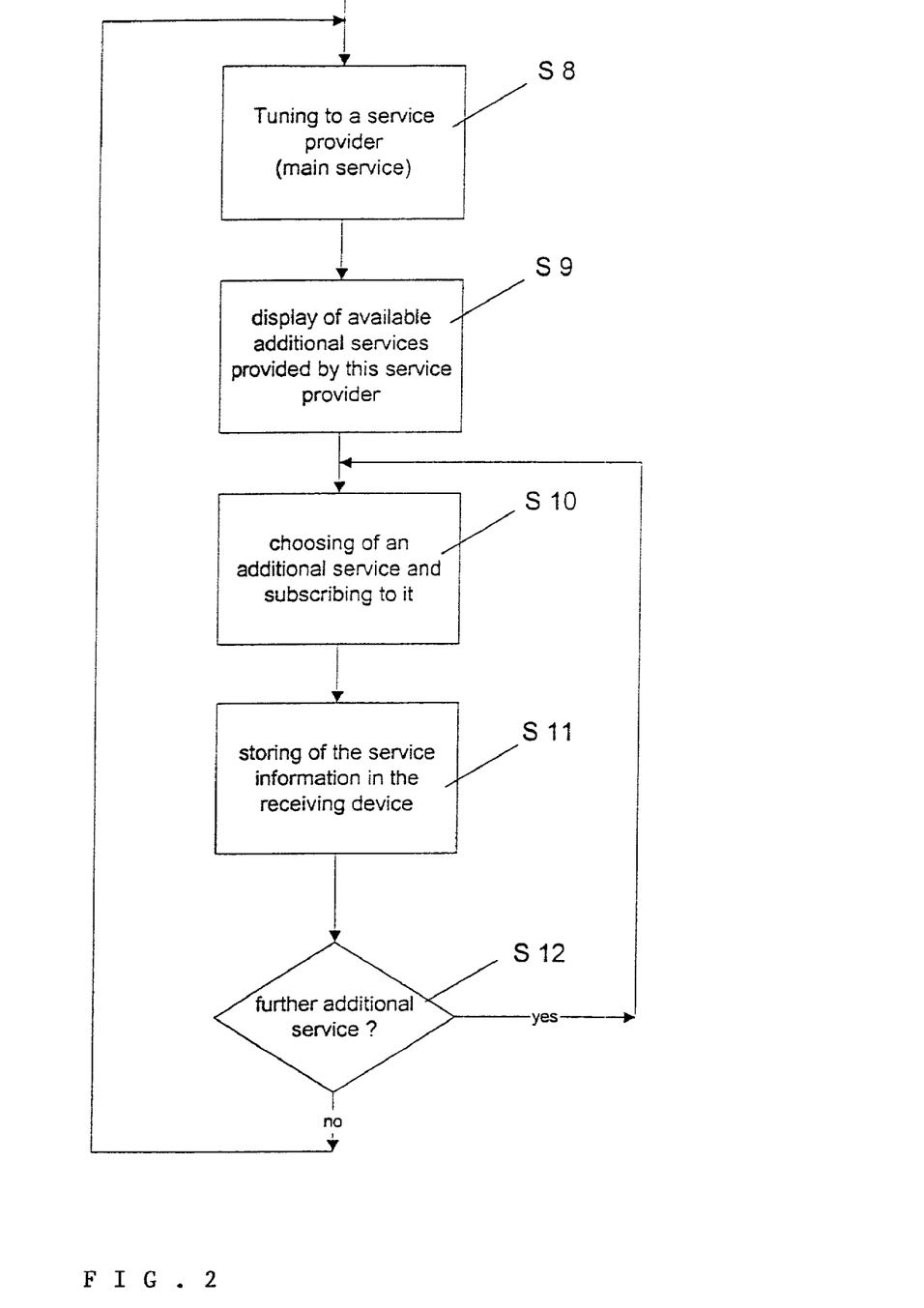
FIG. 2 shows a flow chart describing a subscribing process to choose additional services to be accessed by the receiving device according to the present invention.

In the following, a preferred embodiment of a process subscribing to a service will be given with reference to FIG. 2.

In a first step S8, a user of a receiving device turns to a main service provided by a service provider. In the next step S9, all additional services provided by the service provider are shown on the receiving device. Then, in step S10, the user subscribes to one of the additional services displayed in step S9. Having done this, in step S11, service information stored in the receiving device is updated, accordingly. In the next step S12, the receiving device determines whether the user wants to subscribe to a further additional service. If the user wants to, the process returns to step S10. Steps S10 to S12 are repeated as long as the user wants to subscribe to another additional service. Then, the process returns to step S8.

Preferably, but not necessarily in step S10 during the step of choosing a service additional priority information is taken into account as described above. For example, the user can specify different priorities corresponding to different additional services, if the additional services may be transferred at the same time to the receiving device. These priorities may also be set by the service itself according to the service information extracted from the service chosen in step S8 or according to service information stored in the receiving device.

Figure 3:
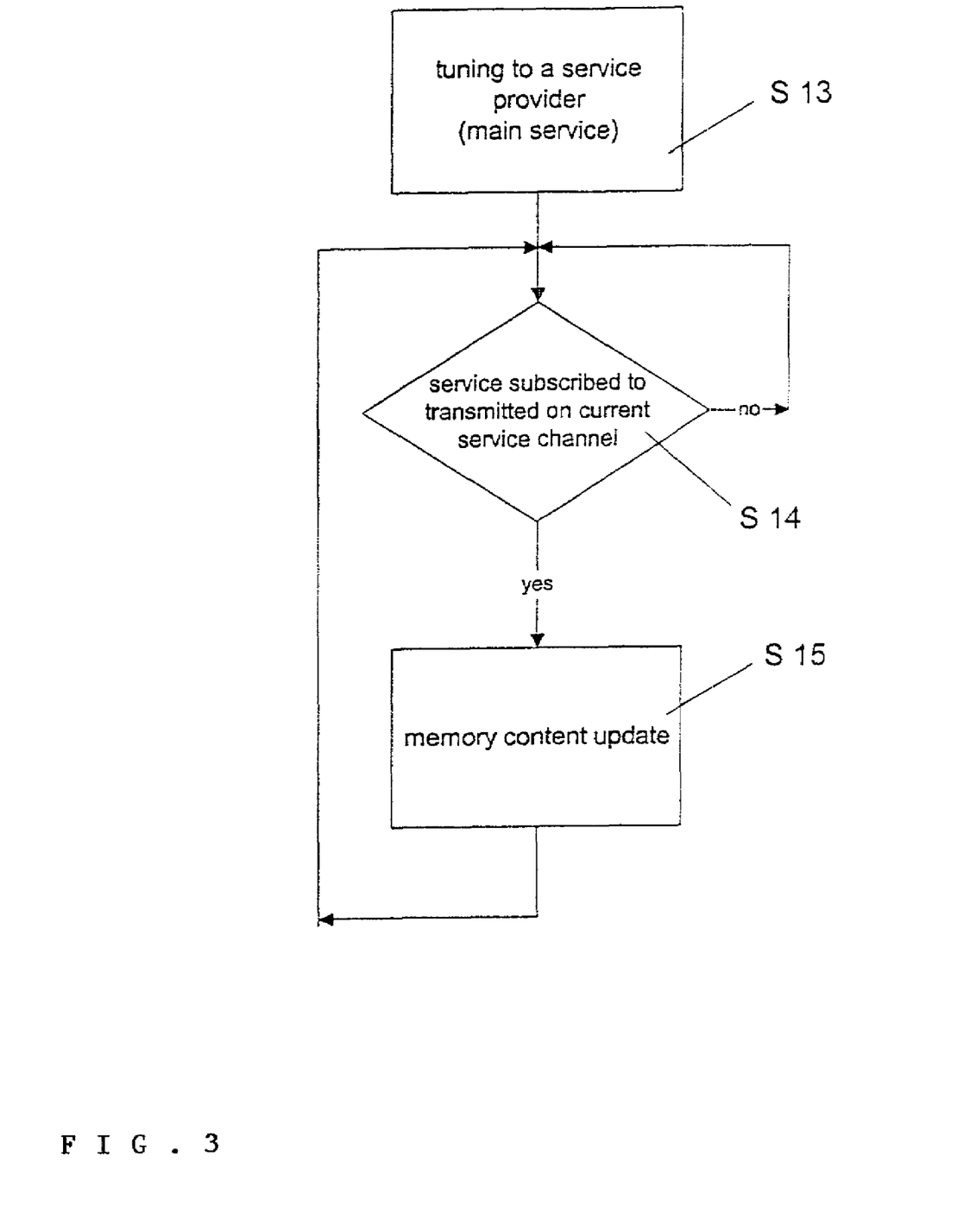
FIG. 3 shows a flow chart describing a process of updating information in a receiving device in the case that the receiving device is in its activated state.

Referring to FIG. 3, an example of an updating process of service information and service data is given, when the receiving device is in its activated state.

In a first step S13, the user turns the receiving device to a main service provided by a service provider. This causes the scheduler to check whether that of the subscribed additional services which will be transmitted next will be received over the same service channel as the main service turned to in step S13. If this is the case, this additional service is accessed and the service information and the service data contained therein is stored in the receiving device. If the additional service transmitted next is transmitted via another service channel, than that tuned to in step S13, this additional service will not be accessed, and the receiving device will wait until the next additional service will be transmitted. In other words, only those additional services which are transmitted on the same service channel as the main service tuned to in step S13 are accessed. If the priority of an additional service is set to a specific level, the currently received program, e.g. an audio program, may be interrupted for said additional service, e.g. in case of an emergency interruption.

Figure 4:
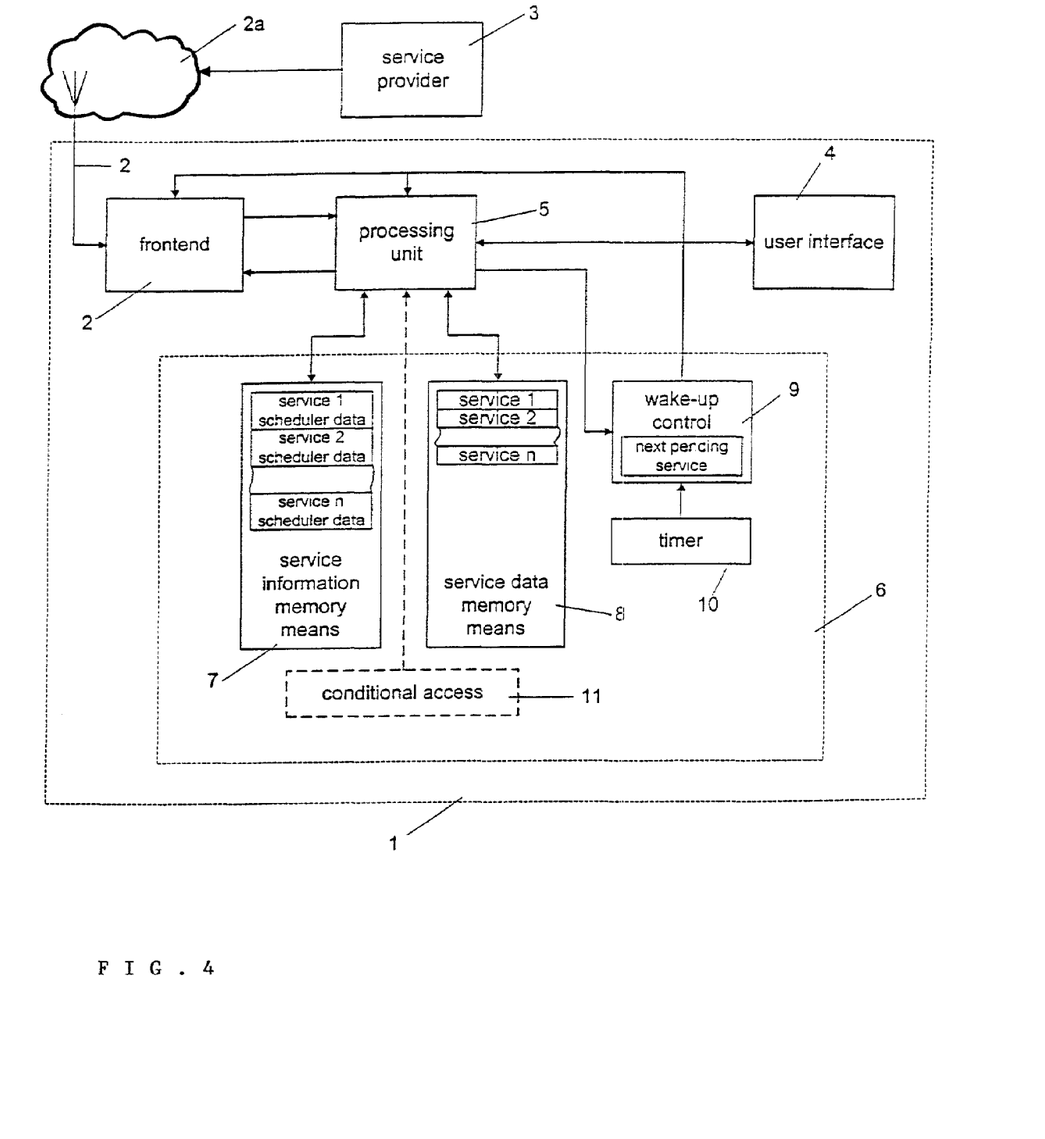
FIG. 4 shows a schematic drawing of a preferred embodiment of a receiving device according to the present invention.

Referring to FIG. 4, a preferred embodiment of an apparatus of a receiving device according to the present invention will be given. A receiving device 1 comprises a receiving means 2 connectable via at least one service channel 2a to at least one service provider 3 for receiving respective services from the corresponding service provider 3, a user interface 4 for informing a user about information stored within the receiving device and for controlling the receiving device by the user, and a processing unit 5 connected to the receiving means 2 and to the user interface 4. The receiving device 1 further comprises a scheduler means 6 connected to the processing unit 5 for controlling the process of accessing services, the scheduler means 6 comprising a service information memory means 7 for storing service information needed by the scheduler 6 to control the receiving means 2, and a service data memory means 8 connected to the processing unit 5 for storing service data extracted by the receiving means 2 from at least one service according to the service information.

Preferably, the scheduler means 6 comprises a wake-up control means 9 connected to the receiving means 2 and the processing unit 5 for activating or deactivating the receiving means 2 and the processing unit 5.

Further, the scheduler means 6 may comprise a timer 10 connected to a wakeup control means 9 for providing the wake-up control means 9 with the actual time.

The receiving means 2 may comprise means for receiving services transmitted (not shown), and may further comprise means for receiving services transmitted wireless or transmitted by cable (not shown).

Optionally, as shown by broken lines in FIG. 4, the receiving device 1 further-comprises an conditional access means 11 which decrypts an encrypted service in case an access is permitted, e.g. after paying for that service. This conditional access means 11 might be arranged within the scheduler means 6, but the arrangement is not limited thereto.

The invention claimed is:

1. A method for accessing one or more additional services temporarily included within a main service provided by a service provider over a common service channel by means of a uni-directional transmission between said service provider and a receiving device configured to be connected to said service provider, whereby said uni-directional transmission is performed by a broadcast signal directed from said service provider to said receiving device without a transmission of signals in the opposite direction and whereby said common service channel comprises said main service, said one or more additional services, and service information indicating how to access said at least one additional service in said common service channel, said method comprising the steps of:
   extracting, from said common service channel presently received by said receiving device, service information about at least one of said additional services comprised in said common service channel;
   accessing said at least one of said additional services about which service information was extracted from said common service channel;
   storing said extracted service information in said receiving device;
   updating said stored service information each time the extracting step is executed;
   activating said receiving device, or necessary parts thereof, configured to receive the common service channel during time intervals in which one or more additional services are sent from the service provider to said receiving device; and
   returning said receiving device or said parts thereof to a pre-activation state after said activating step,
   wherein said processes of activating and returning are carried out on the basis of said stored service information or said latest service information extracted from said common service channel.

2. The method according to claim 1, wherein the extracting step further comprises extracting a service identification and a service name of at least one of said additional services.

3. The method according to claim 1, wherein the extracting step further comprises extracting time information including transmission times of at least one of said additional services.

4. The method according to claim 1, wherein the extracting step further comprises extracting service channel information of at least one additional service showing which common service channel will be used when transmitting a corresponding additional service from a corresponding service provider via said common service channel to said receiving device, respectively.

5. The method according to claim 4, wherein the accessing step further comprises connecting said receiving device to at least one of said common service channels according to said service channel information and said time information.

6. The method according to claim 1, further comprising:
   managing the time order of different accessing processes, when said additional services assigned thereto are transmitted at the same time to said receiving device, respectively,
   wherein said managing process is performed according to said stored service information or said latest extracted service information.

7. The method according to claim 1, further comprising subscribing to a service list containing entries representing available additional services of respective service providers, wherein said process of subscribing changes said stored service information.

8. The method according to claim 7, further comprising the step of eliminating subscribed services in said service list which have no specific priority level when the power resources of said receiving device fall below a predetermined limit.

9. The method according to claim 1, wherein, when the receiving device is in its activated state, only accessing additional services that are transmitted over common service channels used by said main services presently received or that have a specific priority level.

10. The method according to claim 1, further comprising the step of monitoring all additional services provided by a corresponding service provider during the time in which said receiving device receives a main service from said corresponding service provider.

11. The method according to claim 1, further comprising the step of storing service data extracted from said at least one additional service, after having accessed them in the accessing step, in said receiving device, such that said stored service data are accessible.

12. A method for accessing one or more additional services temporarily included within a main service provided by a service provider over a common service channel by means of a uni-directional transmission between said service provider and a receiving device configured to be connected to said service provider, whereby said uni-directional transmission is performed by a broadcast signal directed from said service provider to said receiving device without a transmission of signals in the opposite direction and whereby said common service channel comprises said main service, said one or more additional services, and service information indicating how to access said at least one additional service in said common service channel, said method comprising the steps of:
    extracting, from said common service channel broadcasted by said service provider and presently received by said receiving device, said service information about at least one of said additional services;
    accessing at least one of said additional services about which service information was extracted from said common service channel;
    activating said receiving device or necessary parts thereof configured to receive said common service channel during time intervals in which an additional service is transmitted from the corresponding service provider to said receiving device; and
    returning said receiving device or said parts thereof to a pre-activation state after said activating step,
    wherein said processes of activating and returning are performed on the bais of stored service information or latest service information extracted from said common service channel.

13. The method according to claim 12, wherein the extracting step further comprises extracting a service ID and a service name of at least one of said additional services to enable said receiving device to distinguish between different services.

14. The method according to claim 12, wherein the extracting step further comprises extracting time information including transmission times of at least one of said additional services.

15. The method according to claim 12, wherein the extracting step further comprises extracting service channel information of at least one additional service showing which common service channel will be used when transmitting a corresponding additional service provider via said common service channel to said receiving device, respectively.

16. The method according to claim 15, wherein the accessing step further comprises connecting said device to at least one of said common service channels according to said service channel information and said time information.

17. The method according to claim 12, further comprising the step of storing said extracted service information in said receiving device.

18. The method according to claim 17, further comprising the step of updating said stored service information each time the extracting step is executed.

19. The method according to claim 17, further comprising the step of subscribing to a service list containing entries representing available additional services of respective service providers, said process of subscribing changing said stored service information.

20. The method according to claim 19, further comprising the step of eliminating subscribed services in said service list which do not have a specific priority level when the power resources of said receiving device fall below a predetermined limit.

21. The method according to claim 12, further comprising the step of managing the time order of different accessing processes, when said additional services assigned thereto are transmitted at the same time to said receiving device, respectively, said managing process being done according to said stored service information or said latest extracted service information.

22. The method according to claim 12, further comprising the step of accessing additional services that are transmitted over common service channels used by said main services presently received or that have a specific priority level, when the receiving device is in an activated state.

23. The method according to claim 12, further comprising the step of monitoring all additional services provided by a corresponding service provider during the time in which said receiving device receives a main service from said corresponding service provider.

24. The method according to claim 12, further comprising the step of storing service data extracted from said at least one additional service after having accessed them in the accessing step in said receiving device, said stored service data being accessible.

25. A method for accessing one or more additional services temporarily included within a main service provide by a service provider over a common service channel by means of a uni-directional transmission between said service provider and a receiving device configured to be connected to said service provider, whereby said uni-directional transmission is performed by a broadcast signal directed from said service provider to said receiving device without a transmission of signals is the opposite direction and whereby said common service channel comprises said main service, said one or more additional services, and service information indicating how to access said at least one additional service in said common service channel, said method comprising the steps of:
    extracting, from said common service channel broadcasted by said service provider and presently received by said receiving device, service information about at least one of said additional services;
    accessing at least one of said additional services about which service information was extracted from said common service channel;
    when the receiving device is in its activated state, only accessing additional services that are transmitted over the common service channel used by said main services presently received or that have a specific priority level;
    activating said receiving device or necessary parts thereof for receiving a common service channel during time intervals in which an additional service is transmitted from the service provider to said receiving device; and
    returning said receiving device or said parts thereof to a pre-activation state after said activating step, wherein said processes of activating and returning are performed on the basis of stored service information or latest service information extracted from said common service channel.

26. The method according to claim 25, wherein the extracting step further comprises extracting a service identification and a service name of at least one of said additional services.

27. The method according to claim 25, wherein the extracting step further comprises extracting time information including transmission times of at least one of said additional services.

28. The method according to claim 25, wherein the extracting step further comprises extracting service channel information of at least one additional service showing which common service channel will be used when transmitting a corresponding additional service from a corresponding service provider via said common service channel to said receiving device, respectively.

29. The method according to claim 28, wherein the accessing step further comprises connecting said receiving device to at least one of said common service channels according to said service channel information and said time information.

30. The method according to claim 25, further comprising the step of storing said extracted service information in said receiving device.

31. The method according to claim 30, further comprising the step of updating said stored service information each time the extracting step is executed.

32. The method according to claim 30, further comprising the step of subscribing to a service list containing entries representing available additional services of respective service providers,
wherein said process of subscribing changes said stored service information.

33. The method according to claim 32, further comprising the step of eliminating subscribed services in said service list which do not have a specific priority level when the power resources of said receiving device fall below a predetermined limit.

34. The method according to claim 25, further comprising the step of:
managing the time order of different accessing processes, when said additional services assigned thereto are transmitted at the same time to said receiving device, respectively,
wherein said managing process is performed according to said stored service information or said latest extracted service information.

35. The method according to claim 25, further comprising the step of monitoring all additional services provided by a corresponding service provider during the time in which said receiving device receives a main service from said corresponding service provider.

36. The method according to claim 25, further comprising the step of storing service data extracted from said at least one additional service following the accessing step.

37. An apparatus for accessing at least one additional service included within a main service provided by a least one service provider over a common service channel via a uni-directional connection between said service provider and a receiving device configured to be connected to said service provider, whereby said uni-directional connection is performed by a broadcast signal directed from said service provider to said receiving means without a transmission of signals in the opposite direction, and said common service channel comprises said main service, said at least one additional service, and service information indicating how to access said at least one additional service in said common service channel, said apparatus comprising:
receiving means for receiving said broadcast signal comprising said common service channel;
means for extracting said at least one additional service from said common service channel;
a user interface configured to inform a user and for controlling said apparatus by said user; and
a processing unit connected to said receiving means and to said user interface, the processing unit comprising,
a scheduler means, connected to said processing unit, for controlling said process of accessing said at least one additional service,
a service information memory means for storing service information needed by said scheduler means to control said apparatus, and
a service data memory means connected to said processing unit for storing service data extracted by said receiving means from said at least one additional service according to said service information;
wherein said scheduler means comprises wake-up control means, connected to said receiving means and said processing unit, for (a) activating said receiving means and said processing unit or necessary parts thereof for receiving a common service channel during time intervals in which an additional service is transmitted from the corresponding service provider to said receiving device, and (b) returning said receiving device or said parts thereof to a pre-activation state after said activating step, said processes of activating and returning being carried out on the basis of said stored service information or latest service information extracted from said common service channel.

38. The apparatus according the claim 37, further comprising a conditional access means to decrypt an encrypted service to permit access.

* * * * *